United States Patent [19]

Müller

[11] 4,336,030
[45] Jun. 22, 1982

[54] PROCESS FOR CONTINUOUS CRYSTALLIZATION

[76] Inventor: Tore B. Müller, Blomsterveien 30, Raelingen, 2000 Lilleström, Norway

[21] Appl. No.: 37,305

[22] Filed: May 8, 1979

Related U.S. Application Data

[62] Division of Ser. No. 852,514, Nov. 17, 1977, abandoned.

[51] Int. Cl.$^3$ ............................................. B01D 9/02
[52] U.S. Cl. ................................ 23/301; 159/DIG. 38
[58] Field of Search ................ 23/301, 305 A; 62/540, 62/541; 159/DIG. 38; 422/252; 209/158, 159

[56] References Cited

U.S. PATENT DOCUMENTS

| | | | |
|---|---|---|---|
| 2,853,363 | 9/1958 | Sidun et al. | 23/301 |
| 3,071,447 | 1/1963 | Bernhardi | 209/169 |
| 4,049,773 | 9/1977 | Mejdell et al. | 23/301 |

*Primary Examiner*—Hiram Bernstein
*Attorney, Agent, or Firm*—Watson, Cole, Grindle & Watson

[57] ABSTRACT

A process for the continuous crystallization of at least one crystallizable material from a solution wherein a series of crystallization stages are utilized, with partial crystallization taking place in each stage. The process includes the classification of partially crystallized suspension between each stage, and the suspension from the final stage is passed to a separator wherein it is separated into a concentrated suspension containing crystals and a spent liquor, the concentrated suspension being returned to the final stage and the spent liquor being discharged. Product crystals are taken from the first stage of the series. Partially grown crystals are circulated between consecutive crystallization stages in the series such that a stream of partially crystallized suspension, after being classified to separate the coarse fraction, is passed from one stage to the next stage in the series; whereas a stream of return suspension is passed in countercurrent fashion from the next stage to the preceding one stage without classification. Coarse crystals are taken from the first stage through an elutriation column (hydraulic classification tube) in countercurrent flow to the incoming feed.

8 Claims, 5 Drawing Figures

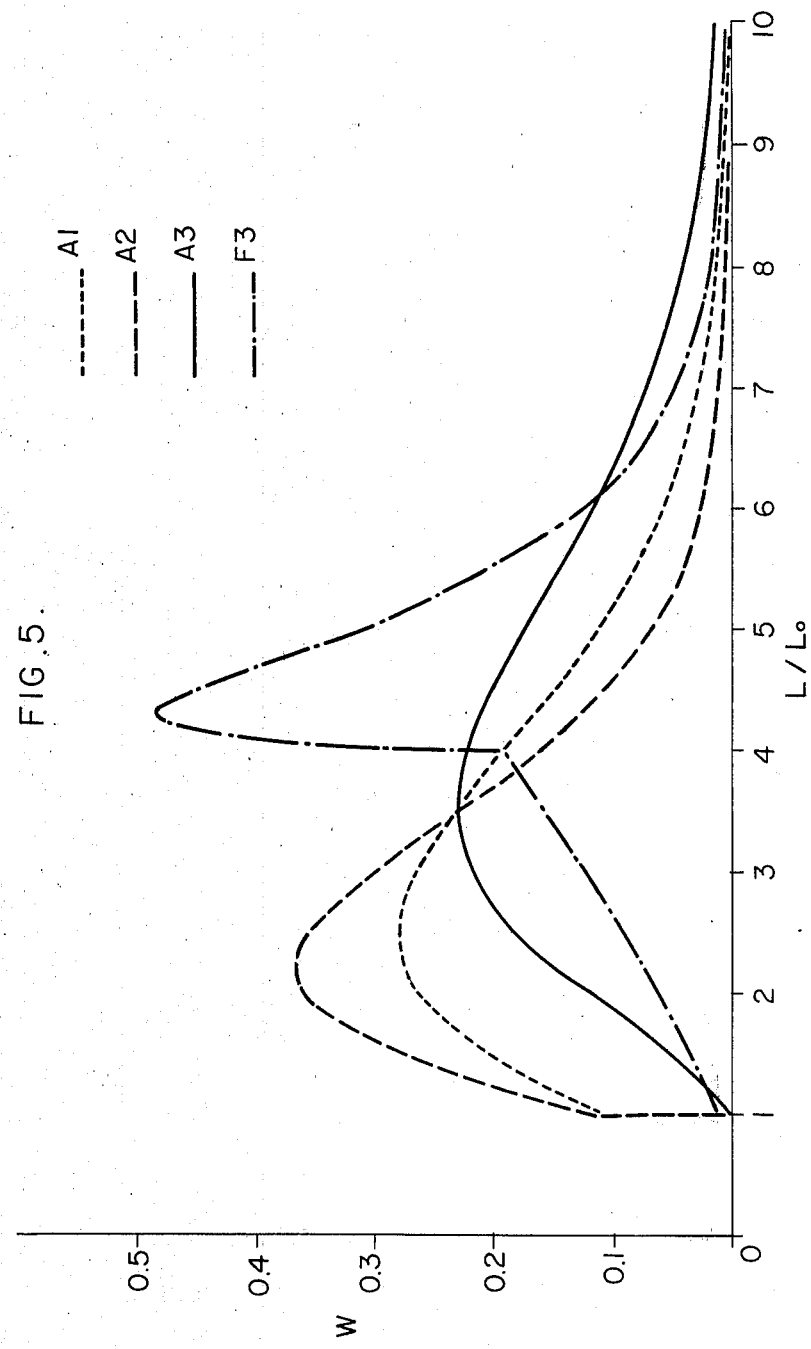

PROCESS FOR CONTINUOUS CRYSTALLIZATION

The present application is a divisional application of application Ser. No. 852,514, filed Nov. 17, 1977, now abandoned, and is related to copending divisional application Ser. No. 037,321, filed May 8, 1979.

FIELD OF THE INVENTION

The present invention pertains to a process for the continuous crystallization of at least one crystallizable material from a solution and wherein at least two crystallization stages are utilized.

BACKGROUND OF THE INVENTION

Continuous multiple stage crystallizers are commonly used in a number of industries, and they are inter alia used in the precipitation of aluminum hydroxide during the manufacture of aluminum oxide. A modern crystallizer for the precipitation of $AL(OH)_3$ in the Bayer process has usually ten or more tanks in series, and the crystals and residual liquor flow from one tank to the next without any sorting out of the crystals. The stream leaving the last tank is classified, the coarse crystal fraction constituting the product, whereas a suspension containing the finer crystals is returned to the first tank of the series. Such recirculation is done for a double purpose: First, to provide seeds for the commencement of crystallization in the first tank; and second, to increase the crystal size of the recirculated finer crystals. The precipitation in the tanks is effected by maintaining the liquor in supersaturated condition, with each tank successively cooler than the previous tank in the series.

Among the disadvantages of such arrangement, however, are that:
(a) the separation step after the last tank is complicated and expensive,
(b) the distribution of crystal sizes in the product is not as may be desired, which may result in difficulties in the further handling of the product, and
(c) the arrangement is sensitive with respect to process instabilities.

Some embodiments of crystallizers which at least partly counteract these drawbacks are known from the patent literature.

Thus, U.S. Pat. No. 3,607,113 discloses a continuous multiple stage crystallizer for aluminum hydroxide. The stages are connected in series so that a liquid stream containing solely fine crystals is passed from one stage to the next. The discharge from the last stage is passed to a separation tank having two outlets. The first outlet discharges crystal-free liquid for further processing and the second discharges crystals and some liquid. The liquid is recycled to the first stage in the series.

In addition, the suspension in each stage is circulated periodically through a cyclone or another type of separator such that the coarser particles can be separated and the remaining stream returned to the stage from which it came. Only one stage at a time has its suspension recirculated, and this is done only when the crystals constitute 50 percent of the volume of the suspension.

The flow pattern of the process according to this U.S. Patent is neither countercurrent nor co-current for the coarser/finer particles. The finer crystals are not completely excluded from the product because a cyclone cannot remove all fine crystals from the coarse crystals. The process is only partially continuous. It is not known whether instabilities in the process can be buffered and if so, in what way.

From German Auslegeschrift No. 1,107,200 it is known to use multistage crystallization for the manufacture of coarse-grained salt by vacuum-cooling. According to this invention, countercurrent crystallization is used, and the liquid containing finer crystals is transported in the opposite direction to the direction of movement of the coarser crystals. The countercurrent flow is achieved by each stage having a classification tube.

The total liquid stream treated in the process must flow up through the classification tubes of each stage. Thus the total through-flow of each of the single is predetermined and cannot be used for adjustment purposes. As the fine crystals can also not be returned to the preceding stage in the series as fine crystals, it is not possible to obtain a defined distribution of the fine particles between the stages. Thus, it is not possible to obtain a product having a selected product size distribution.

According to the invention, it is advantageous to let finer crystals separate from the liquid which is discharged from the last stage and to mix them into the feed to the first stage. As the product is taken from this stage, the possibility exists that the product will contain fine crystals.

Continuous multistage crystallization is also known from German Pat. No. 888,090. The patent pertains to a process and an apparatus for continuous concentration of ice crystals. The apparatus consists of a number of tanks, and the coarser crystals are passed in countercurrent flow to the solution containing the fine crystals. This is achieved by passing a stream of suspension from each tank to an associated classifying centrifuge or other separator, and passing the coarse crystals to the preceding stage, wherein the liquid containing fine crystals is passed back to the stage from which it came. However, the critical size of the crystals cannot be adjusted during the operation of the apparatus. Moreover, a main stream of liquid corresponding to the feed stream and mixed crystals is passed from one stage to the next. With such apparatus, fine crystals are prevented from following the product crystals.

In addition, in the process of this patent, it is possible to control the residence time in each stage only for the coarse crystals and not for the fine ones. The crystallizer is so constructed because coarse particles carry with them relatively less liquid than do fine particles. The only requirement for the distribution of the crystal size in the product is that the crystals are to be as large as possible.

SUMMARY OF THE INVENTION

The present invention pertains to a process for continuous crystallization of at least one crystallizable material from a solution, wherein the solution is passed through a series of crystallization stages, wherein partial crystallization takes place in each stage, wherein partially crystallized suspension is subjected to classifying between each stage, wherein suspension from the final stage is passed to a separator which separates and returns a stream of remaining crystals to the final stage, wherein remaining solution from the separator is discharged, and wherein product crystals are taken from the first stage.

The improvement which characterizes the process according to the present invention involves the fact that partially grown crystals are circulated between consecutive crystallization stages in the series such that a stream of partially crystallized suspension, after being classified to separate the coarse fraction, is passed from one stage to the next in the series, whereas a stream of return suspension is passed in countercurrent fashion from the next stage to the one stage without classification. The suspension of product crystals is taken from the first stage through an elutriation column (hydraulic classification tube) in countercurrent flow to the incoming feed which includes partially grown crystals.

Further, according to a further embodiment of the invention, incoming feed to the first stage can partially be fed in at the very bottom of the elutriator column and partially through a branched conduit connected thereto at a point above the very bottom. In this way the product crystals from the first stage will mainly be greater than a specific particle size which can be adjusted independently of all other control actuations.

According to the invention, the suspension level in the first stage tank can be used to control the stream of feed solution to the tank from the branched conduit by means of a control means. Such a control means may include a pump or a valve.

Further, according to the invention a portion of the suspension of product crystals from the elutriator column can be passed via a further control means (pump or valve) back into the first stage. In this way the discharge of product crystals from the first stage can be adjusted independently of the classification in the elutriator column.

Further, according to the invention the stream of partially crystallized suspension between the two stages can be hydraulically connected via a valve to control the stream of return suspension between these same two stages.

Further, according to the invention the liquid level in a stage can be used to control a third control means (pump or valve) for the stream of partially crystallized suspension coming into the stage.

Further, according to the invention the stream of partially crystallized suspension from the final stage can be used to control the stream of remaining solution from the separator simultaneously with the stream of remaining crystals being maintained unaltered.

According to the invention the classification after a stage can be carried out in a device which holds back crystals which overcome a selected linear velocity for the suspension of partially crystallized suspension in the device, and the selected linear velocity can be controlled by means of a variable pump in the stream of partially crystallized suspension.

The classification of the crystals in the stream of partially crystallized suspension can thus be regulated independently of all other control actuations.

Further, according to the invention, the classification can be carried out by having the stage formed as a tank comprising an annular classification chamber which the partially crystallized suspension must pass through before proceeding to the next stage.

According to the invention the stream of return suspension can be controlled by means of a fourth control means (pump or valve).

Thus, the stream of return suspension can be controlled independently of all other control actuations.

According to a further features of the invention, a mechanical or electronic device can coordinate the governing of the actuating means for feed entering at the bottom of the elutriation column, the stream of suspension of product crystals back to the first stage, the stream of partially crystallized suspension and the stream of return suspension so that the product crystals are given a predetermined particle size distribution and/or that the crystals in each stage represent a determined surface area.

The mean size of the product crystals, their distribution around the mean size and their minimum size thus can be regulated within certain limits independently of other regulation actions.

Compared with previous processes for continuous crystallization in one or more stages, the process according to the present invention offers the following advantages:

A. The residence time for crystals above a minimum product size can in principle be varied in unlimited fashion for a given crystallizer volume. For a given production rate a reduction of the crystallizer volume is achieved.
B. An improved crystal size distribution in the product is obtained due to the fact that:
  (i) No crystals are smaller than a selected minimum size.
  (ii) The size of the crystals expressed as mean weight can be selected within wide limits.
  (iii) The scattering around the mean size can be selected within specific limits.
C. The operation can be made stable without any substantial degree influencing the size distribution of the product crystals.
D. Special separators to separate fine and coarse crystals are superfluous.

All continuous processes for crystallization from solution can in principle be carried out by means of the process according to the present invention. This applies independently of whether or not the supersaturation is created by cooling, evaporation, salting out, chemical reaction or a combination of these procedures.

Also, crystallization which hitherto has been carried out in a single stage can in more than one way be improved by being carried out by the process according to the present invention, but the greater technical and economical profit will presumably be obtained in connection with crystallization processes which are to be carried out in a number of stages. An example is the precipitation of $Al(OH)_3$ in the Bayer-process for the preparation of aluminum oxide. Here the ability to achieve precipitation of crystallizable material is low and the product crystals tend to be too fine.

The invention will now be better understood by reference to the accompanying drawings and the following description.

DESCRIPTION OF THE DRAWINGS

FIG. 5 depicts a chart of the crystal size distribution expressed on a weight basis in the product for specific examples A1, A2, A3 and F3.

DETAILED DESCRIPTION OF THE PREFERRED EMBODIMENT

Figure 1:
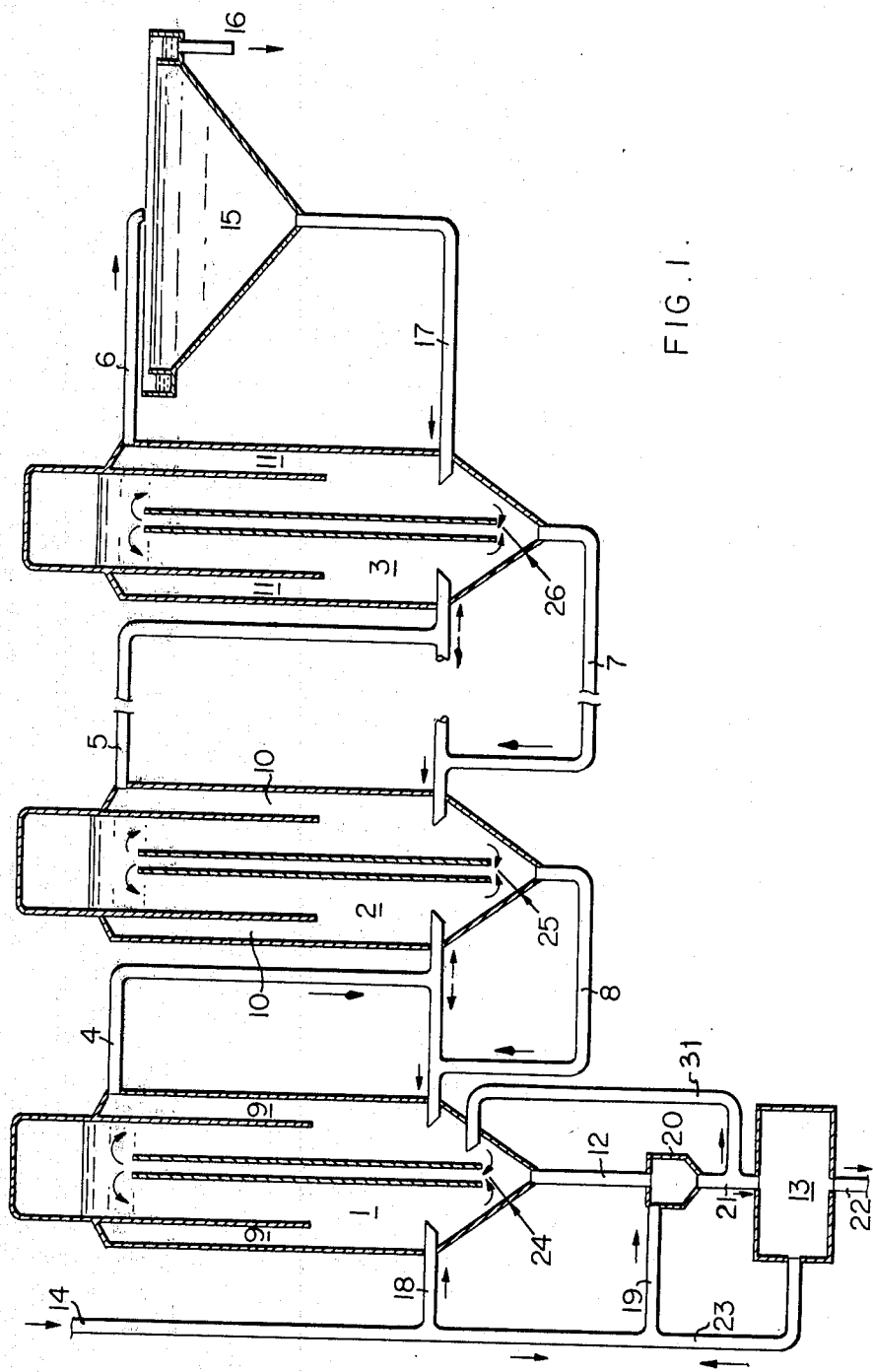
FIG. 1 shows a schematic view of a crystallizer system used in the process according to the present invention.

FIG. 1 depicts a crystallizer system in accordance with the present invention, which includes three stages represented by tanks 1, 2 and 3. The fluid conduit lines between tanks 2 and 3 are shown to be interrupted so as to indicate that the crystallizer system can include further stages (tanks). Super-saturation within each tank can be achieved by a number of different techniques, e.g., by cooling the tanks with mantles (not shown) or cooling coils (not shown), or by cooling fluids passing through the feed lines to each tank with heat exchangers.

Corresponding means can be utilized for supplying heat to each tank when the supersaturation in each tank is to be created by evaporation.

Each tank has an arrangement for internal circulation of suspension. As schematically shown in FIG. 1, such apparatus can include pressurized air pumps 24, 25 and 26, respectively, which circulate slurry upwardly through centrally positioned tubes in each tank (the pressurized air being supplied to the bottom of each tube through a conduit which has its outlet immediately below the lower opening to the tube). Alternatively, the internal circulation can be provided by means of mechanical stirrers (not shown).

Each tank has an overflow conduit 4, 5 and 6, respectively. In addition, each tank (with exception of the first one) has also an underneath flow conduit 7 and 8), respectively. Each tank is further provided with an arrangement for classification of the overflow which, as shown in FIG. 1, comprise annular chambers 9, 10 and 11, respectively, (but also other arrangements as for example hydrocyclones may be used). The dimensions of the annular chambers determine the linear liquid velocity for a given volumetric flow rate and determine thereby the size of the crystals which do not follow the fine fraction of the suspension out of the tank.

Instead of an underneath flow conduit, tank 1 has an elutriation column 12 which connects to a liquid distributor 20, which, via conduit 21, is itself connected to a filter 13. For a given volumetric feed rate upwards through the elutriation column, the diameter of the elutriation column will be determined by the minimum acceptable crystal size in the product. The filter 13 can be replaced by another apparatus suitable for the separation of solid material from a liquid, for instance a centrifuge. The product crystals which are removed from the filtrate are indicated by an arrow 22, whereas 23 denotes a return conduit for the filtrate to the liquid distributor 20.

The solution which contains at least one crystallizable material is supplied to the crystallizer system through a conduit 14 which has branched conduits 18 and 19, respectively.

As shown in FIG. 1, the overflow from the final tank 3 is passed to a separation (e.g., sedimentation) tank 15 which has an overflow box 16 for spent liquor and a recirculation conduit 17 connecting to the bottom of tank 3. Instead of a sedimentation tank for the separation, a hydrocyclone or a filter may be used.

During operation, the crystallizer system is supplied with solution feed through conduit 14. The greater part is supplied through the branched conduit 19, and the liquid distributor 20, and the elutriation line 12, into the bottom of tank 1. From the bottom of tank 1, crystals of acceptable size sink as product downwards through the elutriation column. To maintain a constant level in tank 1, a portion of the solution feed can be passed directly into tank 1 through the branch conduit 18 at a point above conduit 12 without interfering with the liquid velocity in the elutriation column 12. All tanks contain a mixed suspension, so that the suspension contains both coarse and fine crystals.

The main stream from each tank will leave the tank through the overflow conduits 4, 5 and 6, respectively. Before the suspension reaches the overflow conduit, it has to pass through the annular chamber 9, 10 or 11, respectively, wherein the suspensions are classified by the fact that they have to pass up through the chamber at a given velocity. The coarser crystals leave the tanks in a side stream through lower flow conduits 7 or 8; or, for tank 1, through the elutriation column 12, followed by the liquid distributor 20 and conduit 21 to the filter 13 wherein the product crystals leaving the apparatus through conduit 22 are separated from the accompanying liquor which is itself returned through the return conduit and is reintroduced into tank 1 through the branched conduit 19.

As the solution feed from conduit 14 passes through the stages of the process from tank 1 to the separation tank, the suspensions in each tank will contain the finer crystals passing in suspensions from one tank to the next via conduits such as 4, 5 while mixtures of finer and coarser crystals are passed in suspensions in the opposite direction through return conduits such as 7, 8.

The spent liquor leaves the final tank 3 through the outlet 6, is separated from accompanying crystals in a sedimentation tank 15 and flows as discharge through the overflow box 16. Separated crystals which are in admixture with liquid are passed back to the final tank through the return conduit 17.

The use and placement of conduits 4, 5, 7 and 8 serve a number of independent purposes:
  they allow for a specific classification of the overflow from each tank.
  they allow for a specific recirculation from each tank and thereby specific circulation conditions.
  they maintain a constant level in the tanks under all circumstances.

Figure 2:
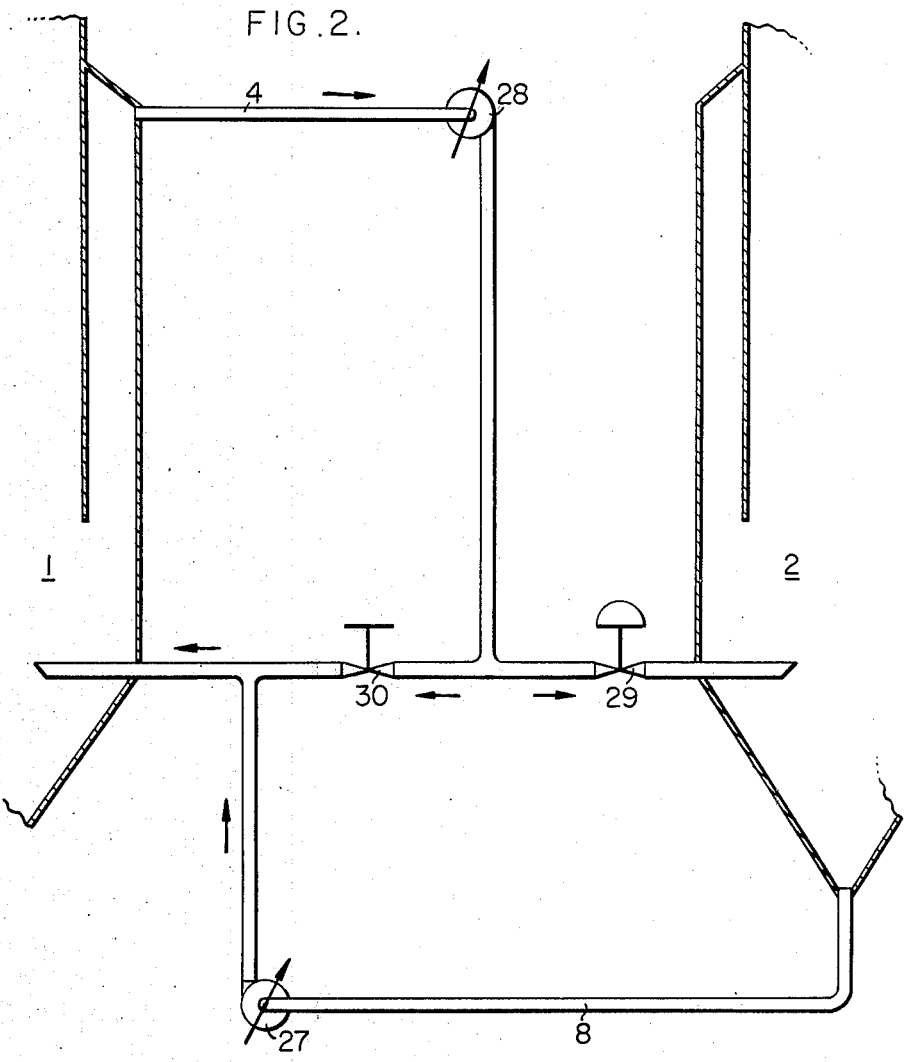
FIG. 2 shows a schematic arrangement for the connection of the tank in the crystallizer system which is utilized.

A more specific showing of the interconnecting conduit system satisfying all these three purposes is shown in FIG. 2. In FIG. 2 the conduit interconnections between two adjacent tanks is shown, in this case between tanks 1 and 2. In addition, the overflow conduit 4 and the underneath flow conduit 8 are also shown. An adjustable pump 27 gives a controlled recirculation stream from tank 2 to tank 1. Another adjustable pump 28 provides a specific overflow stream from tank 1. This stream is split into two portions; the first one being passed into tank 2 through the control valve 29, the second one being returned through the valve 30 to stage 1. The control valve 20 is governed by a level detector (not shown) in tank 2. Variations in the streams into or out of tank 2 will thereby be compensated for by the main stream flowing through the control valve 29.

Thus, the control of the level will have a negligible effect on the transport of crystals between the stages.

Figure 3:
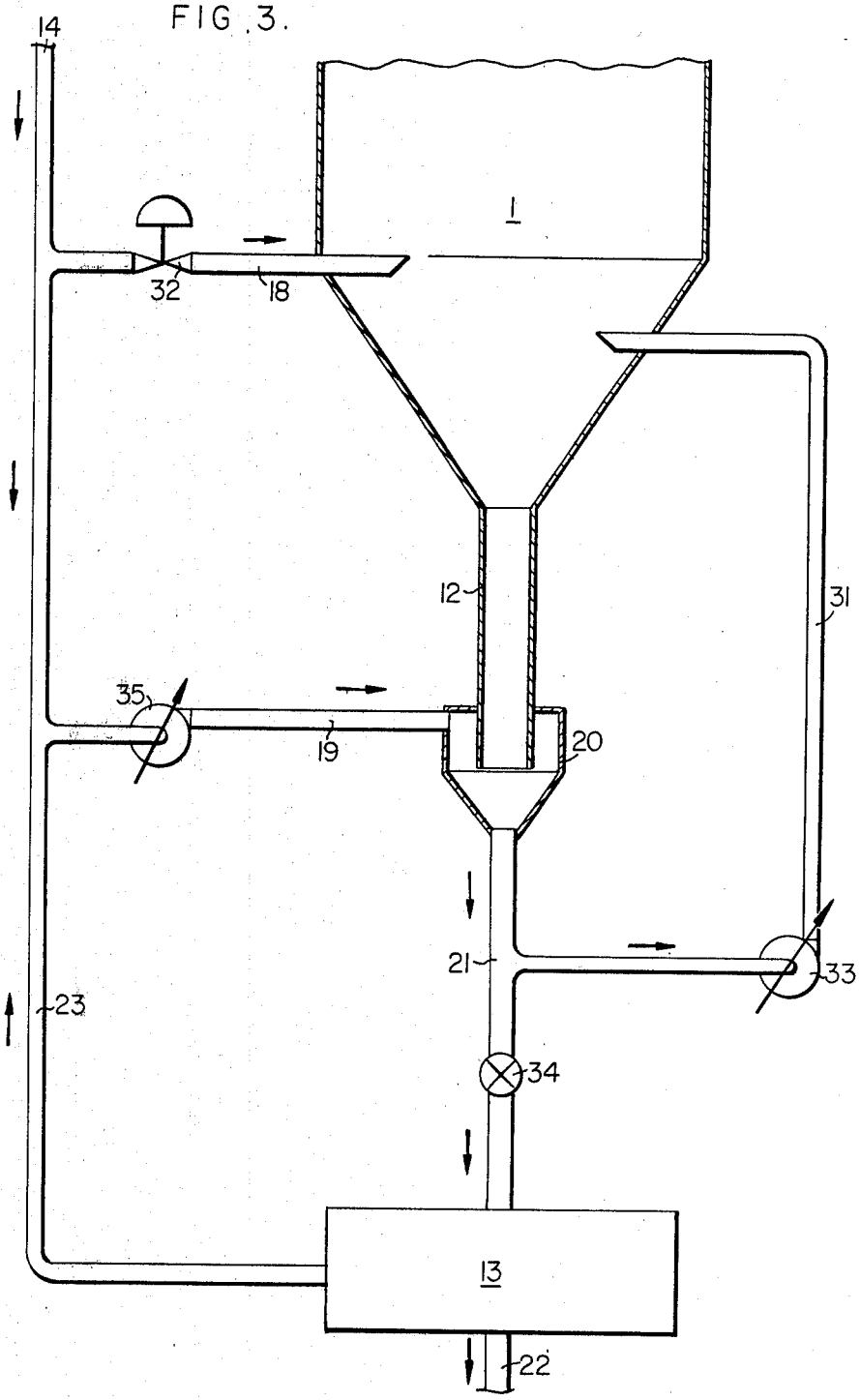
FIG. 3 shows schematic arrangement for the supplying of the feed and for the discharge of product crystals in a crystallizer system in the process of the present invention.

A more specific arrangement for the supply of feed and discharge of product crystals from tank 1 is shown in FIG. 3.

An adjustable pump 33 provides a controlled return stream of suspension containing product crystals and feed solution from the conduit 21 back to tank 1. The main stream of suspension with product crystals is passed through a sluice valve 34 in the conduit 21 and into the filter 13, the sluice valve being replaceable by another type of valve. The adjustable pump 35 in the branched conduit 19 provides a controlled, volumetric rate of feed up through the elutriation column 12, when the stream through the branched conduit 31 is unaltered. By coordinated use of the adjustable pumps 33 and 35, respectively, the classification in the elutriation column and the main stream of product crystals to the filter can be controlled independently of each other.

The control valve 32 in the branched conduit 18 for the feed to tank 1 can be controlled by a level detector (not shown) in tank 1. The level control in tank 1 can thus be effected without interfering with the classification of product crystals or their discharge to the filter.

Some numerical examples will now be used to illustrate the process according to the invention in relations to previously known crystallization processes. Such numerical examples must necessarily be based on substantial simplifications because the process conditions are described by nonlinear, simultaneous differential equations, which must be solved numerically. The following calculations are restricted to the crystal size distribution in each tank stage and in the product. The solutions are analytical and have been found by means of a programmed computer.

Crystallizer systems with recirculation of crystal suspension are to be considered in the first instance. The product contains exclusively crystals larger than a specific size. The size distribution in the product is the same as the size distribution of the discharge tank stage crystals ready to become the product with the exception of a constant concentration factor (i.e. ideal classification). Further, the following conditions are postulated:
steady state operation.
supersaturation created without volume change (for instance by cooling).
the volume proportion of the crystals is negligable.
all crystallizer stages have the same, constant seed density.
the total volume is equal for all crystallizers.
the total mass production is equal for all crystallizers in question and equally distributed for all stages.
the finest product crystal is equal to the reference size (cf. the following).

Figure 4:
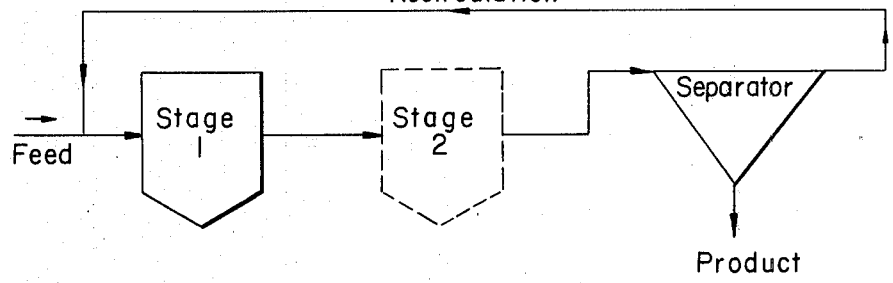
FIG. 4 shows a principle sketch for a previously known multistage crystallizer with classification and external recirculation.

Of conventional crystallizer systems with which it is natural to effect a comparison, a type sketched in FIG. 4 will be considered. In the Examples only 1- and 2-stage, conventional apparatus have been considered.

As a reference for the calculations a 1-stage, conventional crystallizer with recirculation 20% of the feed rate has been selected. As reference size is selected the size to which a crystal seed grows during the total residence time of the liquid in the reference crystallizer system. Reference area is total crystal surface in the reference crystallizer system.

By calculation of a crystallizer system used in the process of the invention, the removal of the product crystals must be represented in a special way. The transport is represented by a fictitious volume stream multiplied by the size distribution of the product crystals in the discharge stage. The volume stream is selected so that the product crystals have approximately the same residence time in both stages.

The classification of the main stream of partially crystallized suspension from the first stage is supposed to be ideal.

The calculations have been effected based on the following equations:

$$\frac{d}{d\lambda} f_i(\lambda) = \eta \alpha_i \{[\Sigma[\nu(\lambda)f(\lambda)]_{in,i} - \Sigma[\nu(\lambda)f(\lambda)]_{out,i}\}; i = 1,2$$

$$\lambda = L/L^\circ$$

$$\alpha_i = A_i/A^\circ$$

$$\nu(\lambda) = \dot{V}(\lambda)/\dot{V}_f$$

$$A_i = k_a \int_0^\infty \lambda^2 f_1(\lambda) d\lambda$$

$$\overline{\lambda_\omega} = \int_{\lambda_p}^\infty \lambda^4 f_p(\lambda) d\lambda / \int_{\lambda_p}^\infty \lambda^3 f_p(\lambda) d\lambda$$

$$C.V. = 100\% (\lambda_{0.16} - \lambda_{0.84})/2\lambda_{0.50}$$

wherein $\lambda_x$ is defined by the equation $$\int_{\lambda_x}^\infty \lambda^3 f_p(\lambda) d\lambda = x \int_{\lambda_p}^\infty \lambda^3 f_p(\lambda) d\lambda$$

$$\omega(\lambda) = \lambda^3 f_p(\lambda) / \int_{\lambda_p}^\infty \lambda^3 f_p(\lambda) d\lambda$$

The symbols have the following meaning:
$A_i$—the total surface area of crystals in stage number i is relative to the tank volume
$A^\circ$—reference surface relative to the tank volume
C.V.—coefficient of irregularity (scattering)
$f(\lambda)$—population density with dimensionless crystal size as argument
$f_p$—population density in suspension with product crystals
i—stage number
$k_a$—area factor
L—characteristic dimension of crystal (for instance diameter)
$L^\circ$—reference size
n—number of stages in the crystallizer
$\dot{V}(\lambda)$—stream of crystal suspension with population density f( )
$\dot{V}_f$—stream of feed
$\omega$—normalized weight distribution
$\overline{\lambda}_{107}$—mean crystal size calculated on a weight basis.

The result of the calculations are shown in the following Table I. FIG. 5 shows the crystal size distribution in the product for the Examples A1, A2, A3 and F3.

Examples A1, A2, A3 and B1, B2 and B3 show that with the same recirculation, a process according to the invention gives more than 3 times greater crystal surface. Greater crystal surface means lower growth rate, i.e. lower supersaturation, i.e. higher efficiency for the precipitation.

Example A3 gives greater mean size than for A1 and A2. Example K3 has to the contrary approximately the same mean size and coefficient of irregularity, i.e. scattering, as A2, whereas the crystal surface is nearly four times greater.

If one takes point of departure in Example 3, Examples C3 and D3 will show in what way the mean size of the product can be decreased or increased, while the scattering is unaltered. Examples E3 and F3 demonstrate that the mean size can be maintained unaltered while scattering is specified independently of the mean size. The limits for such variations are extended by increasing the number of stages in the cyrstallizer system.

The Examples G3 and H3 show in what way the total crystal surface can be reduced without influencing the size distribution in the product to any significant degree. The percentual reduction is 19 and 28, respectively. The extra reduction for Example H3 is at the expense of somewhat greater scattering. Examples I3 and J3 show correspondingly increase of the area of 60 to 68%, respectively. Such alterations in the crystal surface will influence the seed formation and thereby the stability in the crystallizer system.

TABLE I

| Type | Crystal surface, mean size and scattering for different crystalizers | | | | | | | | | | | | | | |
|---|---|---|---|---|---|---|---|---|---|---|---|---|---|---|---|
| | Conventional | | | | Crystallizer used according to the invention | | | | | | | | | | |
| Identification | A1 | B1 | A2 | B2 | A3 | B3 | C3 | D3 | E3 | F3 | G3 | H3 | I3 | J3 | K3 |
| Number of stages | 1 | 1 | 2 | 2 | 2 | 2 | 2 | 2 | 2 | 2 | 2 | 2 | 2 | 2 | 2 |
| Recirculation (%) | 20 | 50 | 20 | 50 | 20 | 50 | 50 | 10 | 43,5 | 103 | 19,5 | 25 | 20,5 | 17 | 150 |
| Product stream (%) | — | — | — | — | 20 | 20 | 20 | 20 | 20 | 20 | 30 | 30 | 10 | 10 | 20 |
| Largest crystal in overflow | — | — | — | — | 1,0 | 1,0 | 0,84 | 1,18 | 0,01 | 4,0 | 0,5 | 0,5 | 1,5 | 1,5 | 0,7 |
| Crystal surface in stage 1 | 1,0 | 0,86 | 0,64 | 0,56 | 4,02 | 4,93 | 4,94 | 3,43 | 4,69 | 3,74 | 2,70 | 2,88 | 7,97 | 7,68 | 6,46 |
| Crystal surface in stage 2 | — | — | 1,11 | 0,96 | 2,49 | 1,30 | 1,22 | 4,25 | 0,97 | 3,51 | 2,53 | 1,83 | 2,44 | 3,24 | 0,52 |
| Mean surface | 1,0 | 0,86 | 0,88 | 0,76 | 3,25 | 3,11 | 3,08 | 3,84 | 2,83 | 3,63 | 2,62 | 2,35 | 5,21 | 5,46 | 3,49 |
| Mean size - 50% weight basis | 3,42 | 3,19 | 2,91 | 2,71 | 4,53 | 3,63 | 3,70 | 5,31 | 4,54 | 4,53 | 4,53 | 4,52 | 4,54 | 4,53 | 2,88 |
| Coeff. of irregularity[1] (%) | 49,6 | 49,1 | 44,1 | 43,2 | 44,3 | 42,2 | 44,3 | 44,3 | 55,4 | 18,5 | 44,7 | 49,4 | 43,9 | 39,7 | 44,2 |

(All sizes and surfaces are relative to the reference values)
[1]Definition: $(L_{0,16} - L_{0,84})/2 \cdot L_{0,50}$, wherein 16 percent by weight of the crystals are larger than $L_{0,16}$.

In a second instance also other comparison tests were carried out, with different process designs, the results of which appear from the following items 2 and 3, respectively.

2. PRECIPITATION OF ALUMINA IN THE BAYER PROCESS

Simulation of continuous precipitation for different process designs, based on conditions for the Baton Rouge alumina plant of Kaiser Aluminium & Chemical Corp. (see article by K. M. Reese and W. H. Cundiff in Ind. & Eng. Chem., Vol. 47, No. 9 (1955).

Basis:
Pregnant liquor:
$Al_2O_3$: 112 g/l (feed to the first precipitation stage), Ratio by weight of $Al_2O_3/Na_2O$:1.10
Temperature: 72 centigrades.
Spent liquor: Ratio by weight of $Al_2O_3/Na_2O$:0.56 (after the last prec. stage)
3 precipitation stages. The results appear from Table 2.

Precipitators simulated:
Type A: Conventional cocurrent with a volumetric recirculation rate of 10 pct of feedrate.
Type B: Countercurrent without product classification or internal circulation of crystals (negligible amounts of crystals in overflow).
Type C: Countercurrent with product classification and internal circulation of crystals.

TABLE 2

| Type | A | B | C |
|---|---|---|---|
| Apparatus: | | | |
| Volume reduction, pct | — | 68 | 82 |
| Heat economy: | | | |
| Temp. of spent liquor, centigrade | 58 | 64 | 65 |
| Product: | | | |
| Mass-averaged size, μm | 72[1] | 105 | 55 |
| Smallest particle, μm | 30 | 0 | 44 |
| Mean square dev., μm | 19 | 43 | 10 |
| Pct. by weight - 325 mesh (44 μm) | 10 | 4.2 | 0 |
| Surface area, $m^2/kg$[2] | 38 | 28 | 47 |

[1]50 pct. by weight of - 200 mesh (75 μm).
[2]Purely spherical particles

3. FAST PRECIPITATION

Simulation of an artificial continuous precipitation process in different apparatus configurations. Supersaturation amounts to 0.1 pct. or less of the concentration drop across the crystallizer.

Basis:
Feed solute conc.: 50 g/l
Effluent solution conc.: 1 g/l
3 precipitation stages. The results appear from Table 3.

Precipitators simulated:
Type A: Single-pass without any classification.
Type B: Conventional cocurrent with 20 pct. by volume of recirculation compared to feed rate and product classification.
Type C: Countercurrent without product classification or internal circulation of crystals.
Type D: Countercurrent with product classification and internal circulation of crystals.

TABLE 3

| Type | A | B | C | D |
|---|---|---|---|---|
| Apparatus: | | | | |
| Volume reduction, pct. | — | 0.6 | −4.2 | 9.7 |
| Product: | | | | |
| Mass-averaged size, μm | 75 | 46 | 77 | 59 |
| Smallest particle, μm | 0 | 30 | 0 | 44 |
| Mean square dev., μm | 38 | 14 | 31 | 5 |
| Pct. by weight - 325 mesh | 21 | 55 | 13 | 0 |
| Surface area, $m^2/kg$[1] | 44 | 58 | 38 | 51 |

[1]Purely spherical particles

I claim:

1. A process for the continuous crystallization of at least one crystallizable material from a solution using a series of crystallization tanks, the process including the steps of
   (a) feeding a feed solution containing at least one crystallizable material to a first crystallization tank in the series;
   (b) initiating a partial crystallization of said feed solution in said first crystallization tank to form a suspension;
   (c) classifying the suspension in said first tank to obtain a suspension fraction containing finer crystals and a suspension fraction containing a mixture of both finer and coarser crystals;
   (d) passing a first portion of said suspension fraction containing finer crystals to at least one additional crystallization tank in the series;
   (e) recirculating a second portion of said suspension fraction containing finer crystals from said first crystallization tank back to said first crystallization tank;
   (f) initiating a further crystallization of said crystallizable material in the suspension in each of said additional crystallization tanks;
   (g) classifying the suspension in each of said additional crystallization tanks to obtain a suspension fraction containing finer crystals and a suspension fraction containing a mixture of both finer and coarser crystals;
   (h) recirculating the suspension fraction containing a mixture of both finer and coarser crystals from each of said additional crystallization tanks to the previous crystallization tank;
   (i) passing a first portion of the suspension fraction containing finer crystals from each additional crystallization tank except the last tank thereof to a subsequent crystallization tank in the series;
   (j) recirculating a second portion of the suspension fraction containing finer crystals from each additional crystallization tank in the series except the last tank back to the tank from which it came;
   (k) passing said suspension fraction containing finer crystals from the last tank in said series to a separator to obtain a mother liquor fraction as discharge and a recovered, concentrated fraction;
   (l) returning said recovered, concentrated fraction to the last tank in said series;
   (m) passing descending coarse crystals isolated by settling out from said suspension fraction containing a mixture of both finer and coarser crystals in said first crystallization tank countercurrent to a liquid solution arriving from a separator system;
   (n) adding the liquid solution to said separator system to mix with said coarse crystals to form a coarse crystal suspension;
   (o) separating said coarse crystals from said coarse crystal suspension in said separator system to form product crystals and a residual solution; and
   (p) mixing said residual solution with at least a portion of the feed solution containing at least one crystallizable material to form said liquid solution of step (n).

2. The process of claim 1, wherein said second portion of said suspension fraction containing finer crystals in said first crystallization tank is recirculated in step (e) to mix with the suspension fraction containing a mixture of both finer and coarser crystals in said first crystallization tank.

3. The process of claim 1, wherein said second portions of the suspension fractions containing finer crystals in each additional crystallization tank in the series except the last tank are recirculated in step (j) to mix with the suspension fractions containing a mixture of both finer and coarser crystals in each of the crystallization tanks from which they came.

4. The process of claim 1, including adjusting said second portion of said suspension fraction containing finer crystals which is recirculated back to said first crystallization tank in step (e).

5. The process of claim 1, including adjusting said second portions of said suspension fractions containing finer crystals which are recirculated to each additional crystallization tank in the series except the last tank in step (j).

6. The process of claim 1, wherein said separator system of step (m) includes a liquid distributor and a filter, and the coarse crystals pass from the first crystallization tank through said liquid distributor to said filter, the liquid solution in step (n) being added to the liquid distributor and the separating in step (o) taking place in said filter.

7. The process of claim 6, including passing a portion of the coarse crystal suspension passing from said liquid distributor to said filter to said first crystallization tank.

8. The process of claim 7, including adjusting the portion of coarse crystal suspension passed to said first crystallization tank.

* * * * *